US012611937B2

(12) United States Patent \
Ahuja et al.

(10) Patent No.: US 12,611,937 B2 \
(45) Date of Patent: Apr. 28, 2026

(54) DRIVE AXLE SYSTEM AND METHOD OF CONTROL

(71) Applicant: ArvinMeritor Technology, LLC, Troy, MI (US)

(72) Inventors: Aakash Ahuja, Escondido, CA (US); Frank J. Falcone, Escondido, CA (US); Ameya S. Jathar, Escondido, CA (US); Aditya Milind Koranne, Escondido, CA (US)

(73) Assignee: ArvinMeritor Technology, LLC, Troy, MI (US)

( * ) Notice: Subject to any disclaimer, the term of this patent is extended or adjusted under 35 U.S.C. 154(b) by 257 days.

(21) Appl. No.: 18/510,788

(22) Filed: Nov. 16, 2023

(65) Prior Publication Data

US 2025/0162426 A1 May 22, 2025

(51) Int. Cl.
| | |
|---|---|
| B60L 7/18 | (2006.01) |
| B60T 1/10 | (2006.01) |
| B60W 30/18 | (2012.01) |

(52) U.S. Cl.
CPC B60L 7/18 (2013.01); B60T 1/10 (2013.01); B60W 30/18127 (2013.01); *B60L 2200/40* (2013.01); *B60L 2240/12* (2013.01); *B60L 2250/28* (2013.01)

(58) Field of Classification Search
CPC .. B60L 7/18; B60L 15/2009; B60W 30/18127
See application file for complete search history.

(56) References Cited

U.S. PATENT DOCUMENTS

| | | | | |
|---|---|---|---|---|
| 6,436,005 | B1 * | 8/2002 | Bellinger | ............ F02D 41/2422 |
| | | | | 477/110 |
| 10,821,948 | B2 | 11/2020 | Fridman et al. | |
| 11,787,418 | B1 * | 10/2023 | Gudeta | ............... B60W 40/107 |
| | | | | 701/1 |
| 2003/0040861 | A1 * | 2/2003 | Bellinger | ............ G01G 19/086 |
| | | | | 702/175 |

(Continued)

FOREIGN PATENT DOCUMENTS

| | | | | |
|---|---|---|---|---|
| CN | 112109554 A | * | 12/2020 | ......... B60T 8/17551 |
| JP | 2011205849 A | * | 10/2011 | |
| JP | 2014027822 A | * | 2/2014 | |

OTHER PUBLICATIONS

Vahidi, Ardalan et al., "Simultaneous mass and time-varying grade estimation for heavy-duty vehicles", Proceedings of the American Control Conference, Denver, CO, Jun. 4-6, 2003, pp. 4951-4956. (Year: 2003).*

(Continued)

*Primary Examiner* — David A Testardi

(74) *Attorney, Agent, or Firm* — Brooks Kushman P.C.

(57) ABSTRACT

A drive axle system and a method of control. The method includes providing propulsion torque with an electrical machine to a vehicle wheel based on a torque command signal. A propulsion torque utilization amount is based on the torque command signal. A regeneration torque multiplier (Continued)

is based on the propulsion torque utilization amount and a signal indicative of speed of the vehicle. Regenerative brake torque is provided with the electrical machine to the vehicle wheel based on the regeneration torque multiplier.

17 Claims, 5 Drawing Sheets

(56)                    References Cited

U.S. PATENT DOCUMENTS

| | | | | |
|---|---|---|---|---|
| 2008/0228367 | A1* | 9/2008 | Aoki ..................... | B60T 8/3655 |
| | | | | 701/70 |
| 2010/0187901 | A1* | 7/2010 | Sonoda ..................... | B60L 7/10 |
| | | | | 303/11 |
| 2011/0022276 | A1* | 1/2011 | Thaduvayi .............. | B60T 7/122 |
| | | | | 701/36 |
| 2013/0146374 | A1* | 6/2013 | Books ..................... | B60L 50/15 |
| | | | | 180/65.21 |
| 2014/0297147 | A1* | 10/2014 | Newman ................... | B60T 8/18 |
| | | | | 701/99 |
| 2014/0346851 | A1* | 11/2014 | Sonoda .............. | B60W 10/184 |
| | | | | 303/3 |
| 2019/0270441 | A1* | 9/2019 | Hoffmann ............. | B60W 20/13 |
| 2020/0247245 | A1* | 8/2020 | Schepmann ....... | B60G 17/0195 |
| 2020/0361469 | A1* | 11/2020 | McCollough ... | B60W 30/18127 |
| 2022/0289038 | A1* | 9/2022 | Yokoo ................ | B60W 50/085 |
| 2023/0226922 | A1* | 7/2023 | Modak ................... | B60L 58/12 |
| | | | | 701/22 |
| 2023/0227047 | A1* | 7/2023 | Weicker ............... | B60W 30/18 |
| | | | | 701/70 |
| 2023/0241981 | A1* | 8/2023 | Godo ..................... | B60L 15/20 |
| | | | | 701/22 |
| 2023/0264693 | A1* | 8/2023 | Lugo-Castillo ....... | B60W 10/10 |
| | | | | 701/22 |
| 2023/0364999 | A1* | 11/2023 | Pettersson .............. | B60L 3/108 |
| 2023/0373295 | A1* | 11/2023 | Yamazaki ................ | B60L 7/26 |
| 2024/0001770 | A1* | 1/2024 | Robere ............. | B60L 15/2009 |
| 2024/0042870 | A1* | 2/2024 | Lugo-Castillo ..... | B60L 15/2018 |
| 2024/0116479 | A1* | 4/2024 | Nguyen ................... | B60L 7/18 |
| 2026/0034988 | A1* | 2/2026 | Gelso ............. | B60W 30/18009 |

OTHER PUBLICATIONS

EPO machine translation of JP 2011-205849 A (original JP document published Oct. 13, 2011) (Year: 2011).*

* cited by examiner

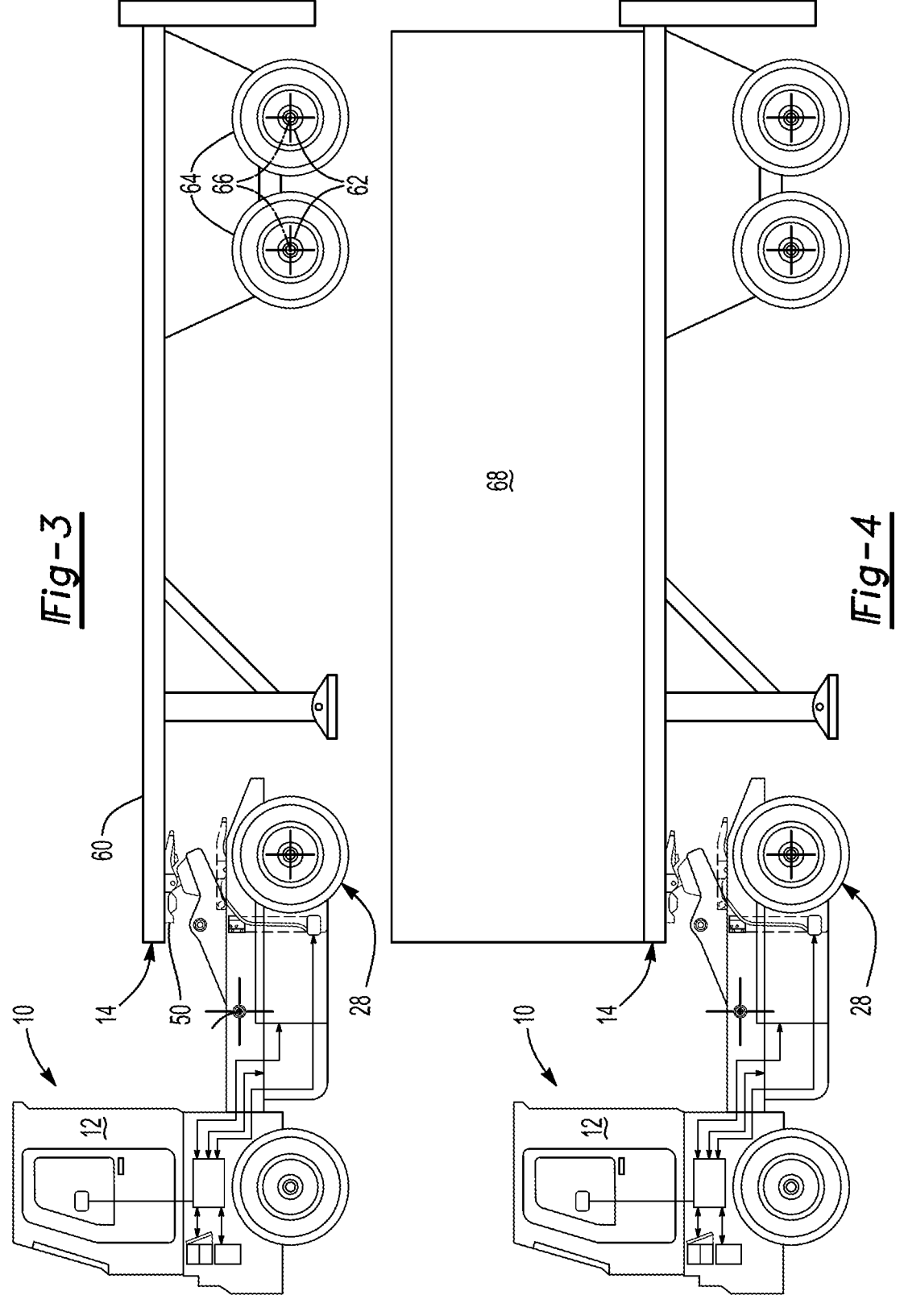
_Fig-3_
_Fig-4_

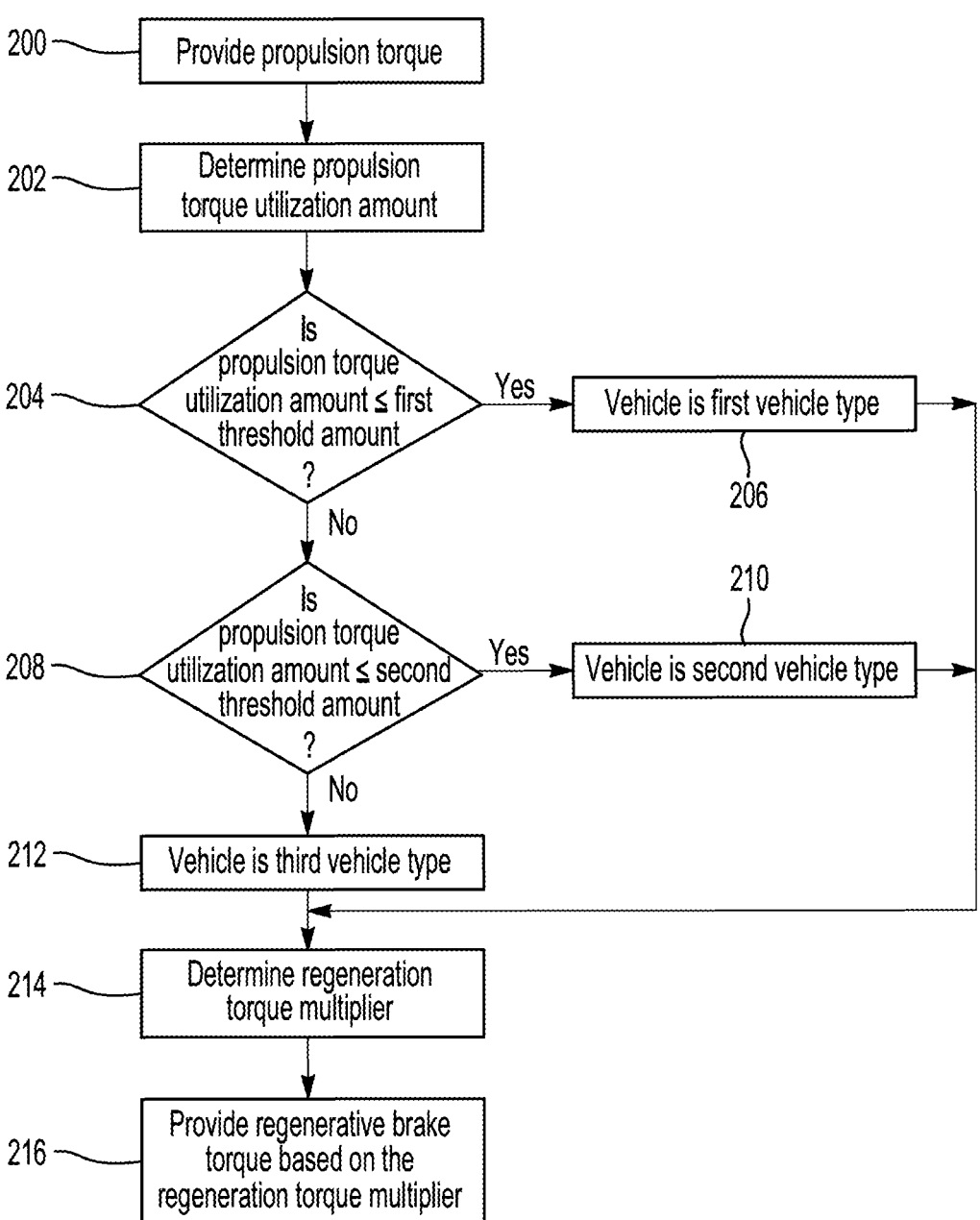
_Fig-5_

| | First Vehicle Type | | Second Vehicle Type | | Third Vehicle Type | |
|---|---|---|---|---|---|---|

Vehicle Speed (mph)

25 —    0.23      0.46      0.85      1.00

20 —

15 —    0.21      0.42      0.8      0.95

10 —

5 —    0.18      0.36      0.7      0.9

0 —

0   10   20   30   40   50   60   70   80   90   100

Propulsion Torque Utilization Amount (%)

DRIVE AXLE SYSTEM AND METHOD OF CONTROL

TECHNICAL FIELD

The invention relates to a vehicle, a drive axle system of a vehicle, and a method of control.

BACKGROUND

A vehicle having a regenerative brake system adapted to effect a regenerative braking command is disclosed in U.S. Pat. No. 10,821,948.

SUMMARY

A method of controlling drive axle system of a vehicle is provided. The method comprises providing propulsion torque with an electrical machine of the drive axle system to a vehicle wheel based on a torque command signal. A propulsion torque utilization amount is determined based on the torque command signal. A regeneration torque multiplier is determined based on the propulsion torque utilization amount and a signal indicative of speed of the vehicle. Regenerative brake torque is provided with the electrical machine to the vehicle wheel based on the regeneration torque multiplier.

The torque command signal may be based on a position of an accelerator pedal of the drive axle system.

Providing regenerative brake torque with the electrical machine to the vehicle wheel may be based on the regeneration torque multiplier and the torque command signal. Providing regenerative brake torque may occur when the torque command signal is indicative of a request for deceleration of the vehicle.

The method may further comprise determining a vehicle type based on the propulsion torque utilization amount. Determining the vehicle type may further comprise comparing the propulsion torque utilization amount to a first threshold amount. The vehicle type may be a first vehicle type when the propulsion torque utilization amount is not greater than first threshold amount. The first vehicle type may be a bobtail.

The method may further comprise comparing the propulsion torque utilization amount to a second threshold amount when the propulsion torque utilization amount is greater than the first threshold amount. The first threshold amount may be less than the second threshold amount. The vehicle type may be a second vehicle type that differs from the first vehicle type when the propulsion torque utilization amount is greater than the first threshold amount and is not greater than the second threshold amount. The second vehicle type may comprise a bobtail and an unloaded trailer coupled to the bobtail.

The regeneration torque multiplier associated with the first vehicle type may be less than the regeneration torque multiplier associated with the second vehicle type at a given vehicle speed.

The vehicle type may be third vehicle type that differs from the first vehicle type and the second vehicle type when the propulsion torque utilization amount is greater than the second threshold amount. The third vehicle type may comprise a bobtail and a loaded trailer that is coupled to the bobtail.

The regeneration torque multiplier associated with the third vehicle type may be greater than the regeneration torque multiplier associated with the second vehicle type at a given vehicle speed.

The regeneration torque multiplier may increase as vehicle speed increases. The regeneration torque multiplier may increase as the propulsion torque utilization amount increases. The regeneration torque multiplier may increase as vehicle speed increases and as the propulsion torque utilization amount increases.

The propulsion torque utilization amount may be a proportion of a maximum available continuous torque associated with the torque command signal.

The regenerative brake torque provided with the electrical machine to the vehicle wheel may decrease as vehicle speed decreases.

BRIEF DESCRIPTION OF THE DRAWINGS

FIG. 3 is a side view of the second example of a vehicle.

FIG. 4 is a side view of a third example of a vehicle.

FIG. 5 is a flowchart of a method of control.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
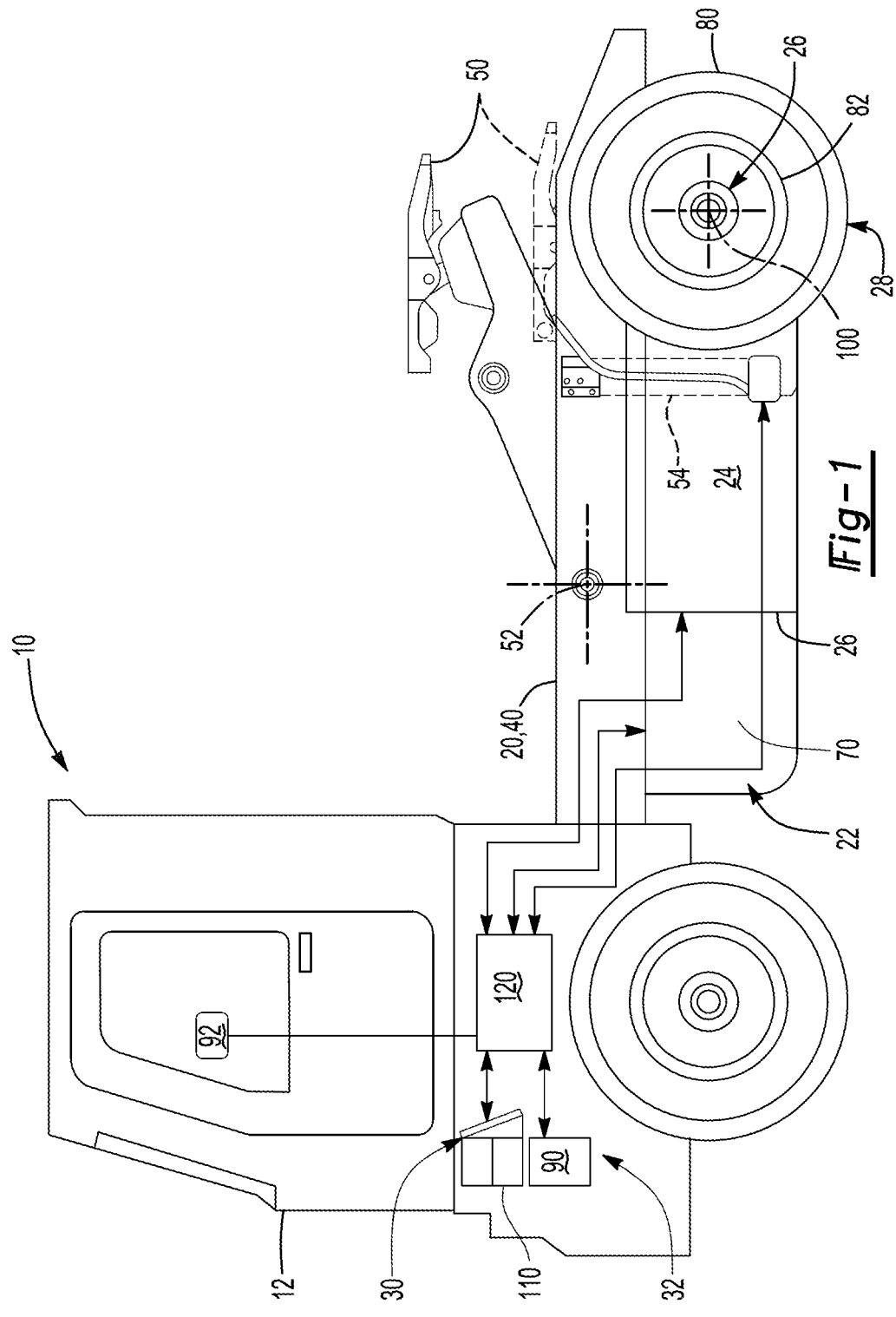
FIG. 1 is a side view of a first example of a vehicle that comprises a drive axle system.
Figure 2:
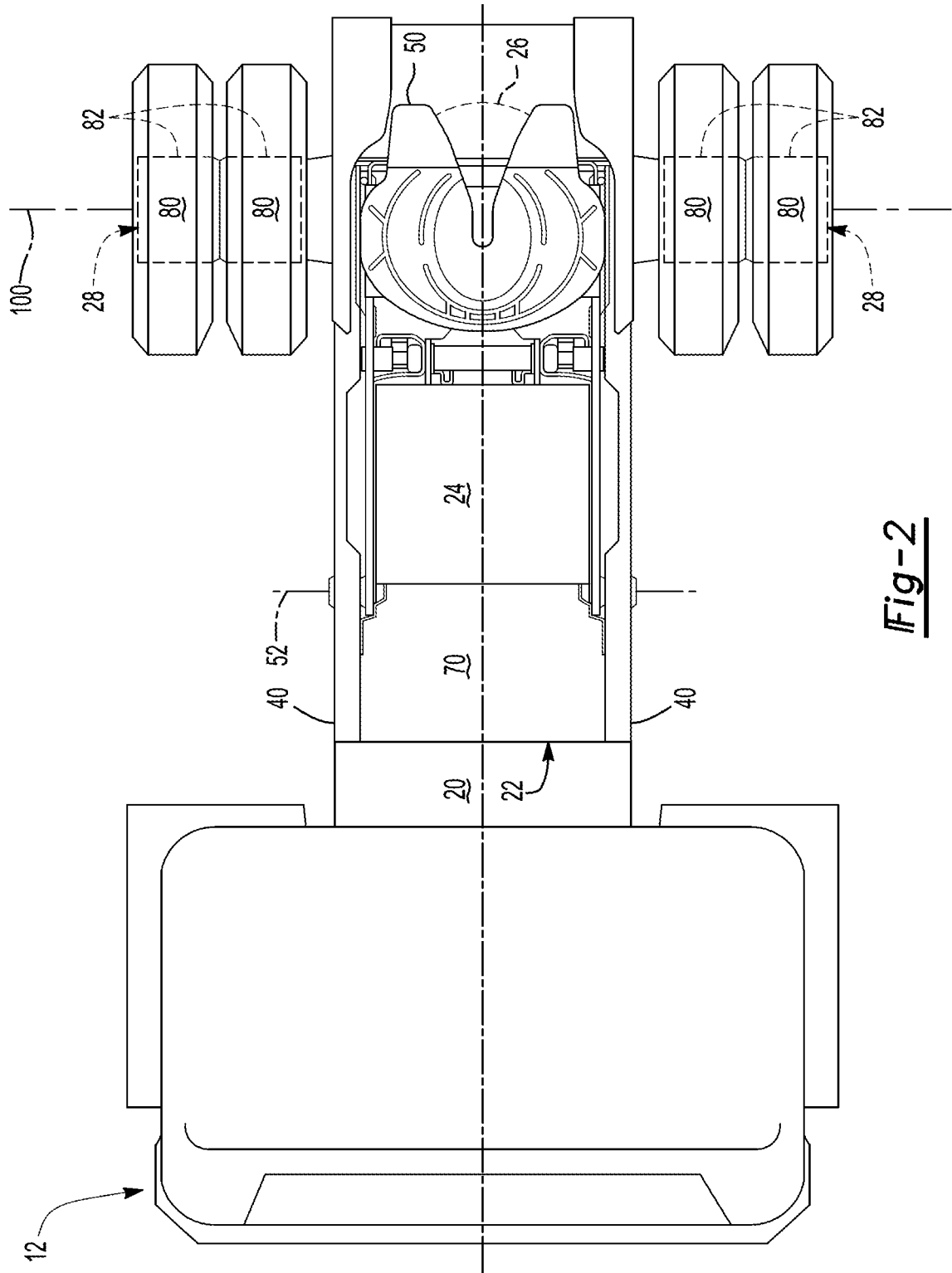
FIG. 2 is a top view of the vehicle shown in FIG. 1.

Referring to FIGS. 1-3, an example of a vehicle 10 is shown. The vehicle 10 may be of any suitable type. For instance, the vehicle 10 may be a land vehicle like a truck, farm equipment, mining equipment, military vehicle, or cargo transport vehicle for land, air, or marine vessels. In the configuration shown, the vehicle 10 is depicted as a cargo transport vehicle and comprises a tractor 12 to which a trailer 14 for transporting cargo may be attached. An example of a trailer 14 is best shown in FIG. 3.

The tractor 12 is configured to move the trailer 14 along a road or support surface. In some configurations, the tractor 12 is a terminal tractor, which may also be called a bobtail, that moves a trailer at a warehouse facility, intermodal freight facility, cargo yard, distribution center, or the like. A tractor 12 that is a terminal tractor may be capable of moving loads in excess of 50,000 pounds (22,680 kg). A terminal tractor may have a lower top speed than other road vehicles. For instance, a terminal tractor may have a top speed of around 25 mph (40 km/h).

Referring primarily to FIGS. 1 and 2, the tractor 12 may be configured as an electric vehicle or hybrid electric vehicle. In at some configurations, the tractor 12 comprises a chassis 20 and a drive axle system 22. The drive axle system 22 comprises at least one electrical machine 24, an axle assembly 26, at least one wheel end assembly 28, an input device 30, and a control system 32.

The chassis 20 is the frame or support structure of the vehicle 10. In some configurations, the chassis 20 includes a pair of frame rails 40. The frame rails 40 may be spaced apart from each other and may extend generally parallel to each other in a longitudinal direction (e.g., a direction that extends between the front and rear of the tractor 12). The frame rails 40 may be interconnected by one or more cross members. In at least one configuration, a coupling 50 may be moveably disposed on the chassis 20.

The coupling 50, which may also be referred to as fifth wheel coupling, allows a trailer 14 to be pivotally coupled to the vehicle 10 in a manner known by those skilled in the art. In some configurations, the coupling 50 is pivotable about a coupling axis 52 to raise and lower the coupling 50 with respect to the chassis 20. In FIG. 1, the coupling 50 is shown in a raised position with solid lines and is shown in a lowered position with phantom lines. One or more actuators 54, such as hydraulic cylinders, are provided to actuate the coupling 50. For instance, an actuator 54 may be mounted to the chassis 20 and may be configured to pivot the coupling 50 about the coupling axis 52. The coupling 50 may be coupled to a trailer 14 when in the raised position and may be detached from the trailer 14 when in the lowered position.

Referring to FIG. 3, an example of a vehicle 10 is shown that comprises the tractor 12 and a trailer 14 that is coupled to the tractor 12 via the coupling 50. The trailer 14, which may also be referred to as or configured as a terminal trailer or bomb cart, is configured to carry cargo. The trailer 14 may not be self-propelled. For instance, the tractor 12 may be configured to move the trailer 14 and the trailer 14 does not propel itself. In some configurations, the trailer 14 comprises a platform or bed 60 and one trailer axle assemblies 62.

The bed 60 is configured to support a load or cargo. In FIG. 3, the trailer 14 is unloaded and no cargo is disposed on the bed 60.

The trailer axle assembly 62 supports the bed 60 and facilitates movement of the trailer 14 along a road or other support surface. One or more trailer axle assemblies 62 may be provided with the trailer 14. In some configurations, the trailer axle assembly 62 comprises a plurality of wheel assemblies 64 that are rotatable about a corresponding wheel axis 66. For instance, a wheel assembly 64 may comprise a tire that is mounted on a wheel. The wheel may be mounted to a wheel hub that may be rotatable about the wheel axis 66 of the trailer axle assembly 62 in a manner known by those skilled in the art.

Referring to FIG. 4, an example of a vehicle 10 is shown that comprises the tractor 12, the trailer 14, and a load or cargo 68. Such a configuration may be referred to as a tractor 12 and a loaded trailer. The term "loaded trailer" is used to designate a trailer 14 that is carrying a load or cargo in addition to its own weight. As such, a loaded trailer may be a fully loaded trailer (e.g., a trailer that is loaded to its maximum load carrying capacity) or a partially loaded trailer (e.g., a trailer that is carrying a load that is less than its maximum load carrying capacity). Cargo 68 may be disposed on the bed 60 or placed on the bed 60 for transport. In the configuration shown in FIG. 4, the cargo 68 is depicted as a shipping container, such as an intermodal container. An intermodal container may be a large, standardized container that is designed for intermodal freight transport in which the intermodal container can be used across different modes of transport, such as a cargo ship, railroad, or truck, without loading and unloading cargo from the intermodal container.

Referring to FIG. 2, one or more electrical machines 24 are provided with the vehicle 10. For example, an electrical machine 24 may be provided with the tractor 12. An electrical machine 24, which may also be referred to as an electric motor, motor-generator, or torque source, may have any suitable configuration. For instance, the electrical machine 24 may include a stator and a rotor that is rotatable about an axis with respect to the stator. The electrical machine 24 is electrically connectable to a power source 70, such as an electrical power source like a battery, capacitor, fuel cell, or combinations thereof. The electrical machine 24 may be connected to the power source 70 via an inverter in a manner known by those skilled in the art.

The electrical machine 24 is configured to provide propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electrical machine 24 is used to brake or slow the velocity of the vehicle 10. Recovered energy may be transmitted along the drivetrain from the vehicle traction wheels to drive the electrical machine 24. Thus, the electrical machine 24 may function as a generator and may be used to charge an electrical power source 70.

The axle assembly 26 operatively connects the electrical machine 24 to a traction wheel assembly that may comprise a tire 80 mounted on a wheel 82. The axle assembly 26 may be mounted to the chassis 20. In the configuration shown in FIG. 2, the axle assembly 26 or a portion thereof may be positioned underneath the coupling 50. One or more axle assemblies 26 may be provided with the vehicle 10. In FIGS. 1 and 2, the tractor 12 is illustrated with a single axle assembly 26. In some configurations, the electrical machine 24 may be fastened or attached to the axle assembly 26. In some configurations, the electrical machine 24 may be remotely positioned from the axle assembly 26 and coupled to the axle assembly 26 with a linkage, such as a shaft.

The axle assembly 26 may have any suitable configuration. As an example, the axle assembly 26 may have a housing assembly that is mountable to the chassis 20. The housing assembly may receive a differential assembly that may be operatively connected to axle shafts and may permit the axle shafts to rotate at different rotational speeds in a manner known by those skilled in the art. The axle shafts operatively connect the differential assembly to the vehicle traction wheels. A drive pinion may be received in the housing assembly and may transmit torque between the electrical machine 24 and the differential assembly. In some configurations, a transmission module is provided between the electrical machine 24 and the differential assembly. The transmission module may provide gear reduction and may transmit torque between the drive pinion and the electrical machine 24. In some configurations, the transmission module may be received in the housing assembly.

One or more wheel end assemblies 28 may be associated with the axle assembly 26. A wheel end assembly 28 may be operatively connected to an axle shaft and may support a wheel 82. For instance, a wheel end assembly 28 may have a wheel hub to which the wheel 82 may be mounted. The wheel hub may be rotatable about a wheel axis 100 and may be operatively connected to a corresponding axle shaft. The wheel hub may be rotatably disposed on a supporting component, such as the housing assembly of the axle assembly 26, a knuckle, a support structure that extends from chassis 20, or the like.

Referring to FIG. 1, the input device 30 is configured to be actuated or operated by a driver or operator of the vehicle 10 to request acceleration and deceleration of the vehicle 10. The input device 30 may have any suitable configuration. For instance, the input device 30, which may also be referred to as a pedal, may be a foot-operated pedal that may be mounted near the floor of the passenger compartment of the vehicle 10 or may be a hand-operated pedal that may be provided in another location, such as proximate a steering wheel or control console of the vehicle 10. In some configurations, the input device 30 includes one or more pedals, such as an accelerator pedal, brake pedal, or both.

The input device 30 may be moveable between a first position and a second position. The first position may be a released position in which the input device 30 is not actuated or depressed by the driver. The first position may correspond with a 0% pedal position when expressed as a percentage. The second position may be a fully actuated or "full throttle" position in which the input device 30 is actuated or depressed by the driver to its fullest extent. The second position may correspond with a 100% pedal position when expressed as a percentage. The input device 30 may have a sensor 110 that provides a signal indicative of the position of the pedal. The input device 30 may also be actuated to multiple intermediate positions between the first position and the second position. These intermediate positions may correspond to input device or pedal positions that are greater than 0% and less than 100% when expressed as a percentage.

The control system 32 is configured to monitor and control various components and devices of the vehicle 10. For example, the control system 32 may include one or more microprocessor-based control modules or controllers 120 that may be electrically connected to or communicate with components of the vehicle 10, such as the electrical machine 24, the axle assembly 26, the input device 30, the actuator 54 for the coupling 50, the power source 70, the inverter, or combinations thereof to monitor and control their operation and performance. For instance, the controller 120 may include a microprocessor, may comprise single processor architectures, multi-processor architectures specialized circuits such as field-programmable gate arrays (FPGA), application specific circuits (ASIC), and the like. In addition, the control system 32 may also process input signals or data from various input devices or sensors, such as a vehicle speed sensor 90, a communication device 92, or both.

The vehicle speed sensor 90 is configured to provide a signal indicative of the speed or velocity of the vehicle 10. The vehicle speed sensor 90 may be of any suitable type, such as a magnetic speed sensor, Hall Effect speed sensor, or the like as is known by those skilled in the art. The vehicle speed sensor 90 may be disposed in any suitable location. For example, the vehicle speed sensor 90 may detect rotation of a wheel hub, axle shaft, drive pinion, or other rotatable component downstream from the transmission module. Moreover, the speed sensor 90 may detect rotation of a wheel hub that is not provided with the axle assembly 26, such as a front wheel in the configuration shown.

The communication device 92 is configured to receive an input from the driver, provide information to the driver, or both. The communication device 92 may be of any suitable type or types, such as a switch, button, sensor, display, touchscreen, or the like. The communication device 92 may be used to input data that may not be predetermined or provided by a sensor. The communication device 92 may allow the driver to enable or disable a method of control, manually adjust the responsiveness of regenerative braking, or both.

Referring to FIG. 5, a flowchart of an example of a method of controlling the drive axle system or a vehicle having a drive axle system is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 32 and may be implemented as a closed loop control system.

As an overview, a vehicle 10 may experience weight changes during use. As an example, a tractor 12 may be operated with or without being coupled to a trailer 14 and the trailer 14 may or may not be loaded with cargo. For instance, a tractor 12 may move a loaded or unloaded trailer 14 from one location to another, then may decoupled from the trailer 14 and driven to another location where a different loaded trailer 14 may then be coupled to the tractor 12. As some examples, a tractor 12 may weigh around 15,000-19,000 pounds (6800-8600 kg), an unloaded trailer 14 may weigh around 15,000-20,000 pounds (6800-9100 kg), and cargo may weigh an additional amount, which in some cases may be 50,000 pounds (22680 kg) or more. In addition, different trailers 14 may have different configurations and different weights (i.e., trailers may not be standardized in their design, weight, or load carrying capacity). Similarly, different cargo or cargo containers may have different weights. As a result, the weight of the vehicle 10 may vary depending on the presence or absence of a trailer, the configuration of the trailer, the presence or absence of cargo on the trailer, and the cargo itself. Moreover, the weight of the vehicle 10 may not be known in real time. For instance, the vehicle 10 may not be equipped with a sensor that provides a signal or data indicative of the weight of the vehicle 10, may not be weighed when its load changes (e.g., when a trailer is coupled or decoupled or when cargo is added or removed, or both).

Vehicle weight affects the driving characteristics of the vehicle. A heavier vehicle may require more propulsion torque from the electrical machine 24 to move the vehicle from a stationary position as compared to a lighter vehicle. The electrical machine 24 may act as a generator and convert kinetic energy from the vehicle's motion into electricity and provide torque that slows the vehicle when regenerative brake torque is requested. For instance, a driver may lift off an accelerator pedal and/or actuate a brake pedal to request regenerative brake torque to decelerate the vehicle 10. Applying a given amount of regenerative brake torque will decelerate the vehicle at a slower rate as the vehicle weight increases (e.g., applying a constant amount of regenerative brake torque will decelerate a heavier vehicle at a slower rate as compared to a vehicle having a lighter weight). In other words, applying the same amount or percentage of regenerative brake torque to vehicles having different weights may result in different vehicle deceleration rates, with the deceleration rate increasing as the vehicle weight decreases. Faster deceleration rates may be less comfortable for the vehicle operator and may affect the drivability of the vehicle. Accordingly, it is beneficial to modify the regenerative brake torque during vehicle operation when the vehicle weight is not directly known, and significant vehicle weight changes are expected during vehicle operation. This may be accomplished using the method illustrated in FIG. 5.

The method in FIG. 5 is primarily discussed in the context of a vehicle being a tractor 12 alone, a tractor 12 coupled to an unloaded trailer 14, and a tractor 12 coupled to a (partially or fully) loaded trailer 14 for illustration purposes. This results in three categorizations or types of vehicles (i.e., tractor alone, tractor with trailer, tractor with trailer with cargo); however, it is contemplated that a greater or lesser number of categorizations or types of vehicles may be associated with the method. The method is also discussed in the context of a single iteration of the method; however, it is to be understood that the method may be executed repeatedly or as a loop while the vehicle is on or in operation to adjust the regenerative brake torque that can be provided.

At block 200, propulsion torque is provided. Propulsion torque may be provided in response to a request for propulsion torque from the input device 30. As an example, the driver may move the input device 30 from the first position toward the second position or further toward the second position to request propulsion torque. The signal from the input device 30 may be referred to as a torque command signal. In some configurations, propulsion torque is expressed as a percentage from 0% to 100% as previously discussed. The electrical machine 24 is controlled or operated by the control system 32 to provide propulsion torque to the vehicle wheels in response to the request for propulsion torque.

At block 202, a propulsion torque utilization amount is determined. The propulsion torque utilization amount is based on the torque command signal. In some configurations, the propulsion torque utilization amount is a proportion of the maximum available continuous torque associated with the torque command signal. The propulsion torque utilization amount may be expressed as a percentage of the maximum propulsion torque that can be continuously provided by the electrical machine 24 when the propulsion torque is requested.

As an overview, an electric motor can provide a continuous torque and a peak torque. This is best understood with reference to the graph in FIG. 6, which shows an example of continuous torque and peak torque that can be provided by the electrical machine 24 at different electric motor speeds.

The continuous torque, which may also be referred to as the continuously available torque, is designated $T_{CNT}$. The continuous torque line represents the maximum amount of torque that can be continuously provided by the electrical machine 24. As such, the continuously available torque represents the highest amount of torque that the electrical machine 24 can produce at a given speed for a long duration or an indefinite period of time. The continuous torque that is available decreases gradually as the speed of the electrical machine 24 increases. For instance, the maximum available continuous torque that can be provided with the electrical machine 24 may decrease as the stator temperature increases, as the rotor temperature increase, as the inverter temperature increases, or combinations thereof. Thus, the maximum available continuous torque may be based on attributes such as stator temperature, inverter temperature, and inverter temperature.

The peak torque, which may also be referred to as the peak available torque or temporary torque, is designated $T_{PEAK}$. The peak torque line represents the maximum amount of torque that can be provided by the electrical machine 24. As such, the peak available torque represents the highest amount of torque that the electrical machine 24 can produce at a given speed for a short duration or a limited period of time, which may typically be less than one second and may be measured in milliseconds. The peak torque may not be constant at all motor speeds. For instance, the peak torque may be constant at low electric motor speeds and may then decrease at higher electric motor speeds after reaching an inflection point. The peak torque is greater than the continuous torque. However, the peak torque can only be provided for relatively short periods of time because providing the peak torque may increase the temperature of the inverter, the stator of the electrical machine 24, the rotor of the electrical machine 24, or combinations thereof. Increased temperature of one or more of these components may reduce or affect the electric motor output torque that can be provided.

In some configurations, the propulsion torque utilization amount may be calculated. In other configurations, propulsion torque utilization amounts or an array of propulsion torque utilization amount may be stored in a lookup table. The propulsion torque utilization amounts may be expressed as percentages (e.g., values between 0 and 1). As an example, the driver may actuate the accelerator pedal from 0% to 50%, thereby requesting propulsion torque (i.e., the torque command signal is indicative of a request for propulsion torque). The control system or controller may then use the torque command signal of 50% as an input to look up a corresponding propulsion torque utilization amount in the lookup table. The propulsion torque utilization amount may vary at different vehicle weights. For instance, the propulsion torque utilization amounts may increase as vehicle weight increases. As an example, the propulsion torque utilization amount associated with a request for propulsion torque of 50% may be 0.3 (30%) when the vehicle 10 is a tractor 12 that is not coupled to a trailer 14, may be 0.5 (50%) when the vehicle is a tractor 12 that is coupled to and unloaded trailer 14, and may be 0.7 (70%) or more when the vehicle 10 is a tractor 12 that is coupled to a trailer 14 that is fully or partially loaded. Thus, in these examples, a smaller amount or smaller percentage of the maximum propulsion torque that can be continuously provided by the electrical machine 24 is used to propel a lighter weight vehicle (e.g., a tractor alone) as compared to a heavier vehicle (e.g., a tractor with a trailer).

Figures 6, 7:
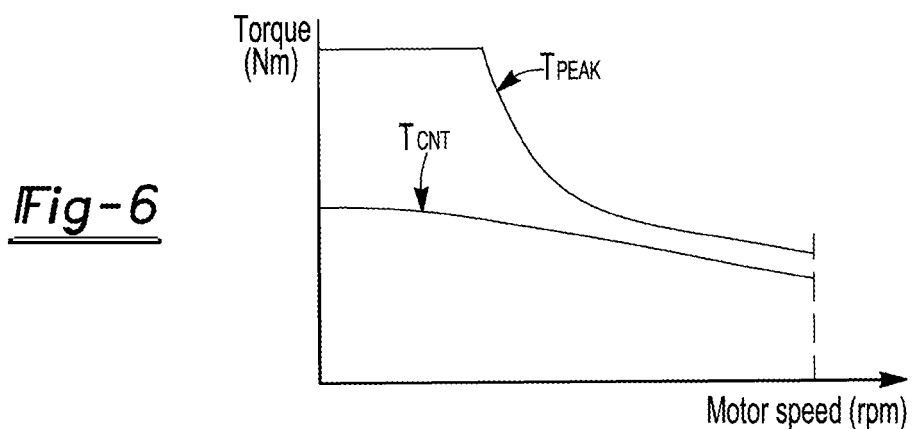
FIG. 6 is a graph of an example of torque limits associated with an electrical machine of the drive axle system.
FIG. 7 is a graph with examples of regeneration torque multiplier values.

At block 204, the method determines whether the propulsion torque utilization amount is less than or equal to a first threshold amount. The first threshold amount may be a predetermined or constant value that may be based on vehicle development testing. For instance, the first threshold amount may be a predetermined value that may be based on the rated output torque of the axle assembly. As an example, the first threshold amount may be expressed as a percentage of the rated output torque or maximum torque output of the axle assembly, such as percentage like 40%. This example of a first threshold amount is represented in FIG. 7 by the vertical dashed line at 40%. As another example, the first threshold amount may not be expressed as a percentage. For example, if the rated or maximum output torque of the axle assembly is 1100 Nm, then the first threshold amount may be 440 Nm (i.e., 40% of 1100 Nm=440 Nm). The first threshold amount may be used to distinguish one vehicle configuration from another as discussed below. If the propulsion torque utilization amount is less than or equal to the first threshold amount, then the method continues at block 206. If the propulsion torque utilization amount is not less than or equal to the first threshold amount, then the method continues at block 208.

At block 206, the vehicle is a first vehicle type or may be designated or identified as a first vehicle type. The first vehicle type may be a tractor 12 that is not coupled to a trailer 14. Using the example above in which in which the driver requests propulsion torque by actuating the accelerator pedal from 0% to 50% and the propulsion torque utilization amount is 0.3 (30%), this propulsion torque utilization amount (30%) is less than or equal to the first threshold amount (40%). The method may continue at block 214.

At block 208, the method determines whether the propulsion torque utilization amount is less than or equal to a second threshold amount. The second threshold amount may be a predetermined or constant value and may be based on vehicle development testing. The second threshold amount is greater than the first threshold amount. For instance, the second threshold amount may be a predetermined value that is based on the rated torque output of the axle assembly. As an example, the second threshold amount may be expressed as a percentage of the rated output torque or maximum output torque of the axle assembly, such as a percentage like 60%. This example of a second threshold amount is represented in FIG. 7 by the vertical dashed line at 60%. As another example, the second threshold amount may not be expressed as a percentage. For example, if the rated or maximum output torque of the axle assembly is 1100 Nm, then the second threshold amount may be 660 Nm (i.e., 60% of 1100 Nm=660 Nm). The second threshold amount may be used to distinguish one vehicle configuration from another as discussed below. If the propulsion torque utilization amount is less than or equal to the second threshold amount (and thus is also greater than the first threshold amount in accordance with block 204), then the method continues at block 210. If the propulsion torque utilization amount is not less than or equal to the threshold amount, then the method continues at block 212.

At block 210, the vehicle is a second vehicle type or may be designated identified as a second vehicle type. The second vehicle type may be a tractor 12 that is coupled to an unloaded trailer 14. Using the example above in which the driver requests propulsion torque by actuating the accelerator pedal from 0 to 50% and the propulsion torque utilization amount is 0.5 (50%), this propulsion torque utilization amount (50%) is greater than the first threshold amount (40%) in accordance with block 204 and is less than or equal to the second threshold amount (60%). The method may continue at block 214.

At block 212, the vehicle is third vehicle type or may be designated identified as the third vehicle type. The third vehicle type may be a tractor 12 that is coupled to a (partially or fully) loaded trailer 14. Using the example above in which the driver requests propulsion torque by actuating the accelerator pedal from 0 to 50% and the propulsion torque utilization amount is 70%, this propulsion torque utilization amount (70%) is greater than the first threshold amount (40%) in accordance with block 204 and is greater than the second threshold amount (60%) in accordance with block 208. Thus, in the examples discussed above, the vehicle is a first vehicle type at or below the first threshold amount of 40%, the vehicle is the third vehicle type above the second threshold amount of 60%, and the vehicle is the second threshold type therebetween. In some configurations, the vehicle type may be communicated to the driver via the communication device 92.

At block 214, a regeneration torque multiplier is determined. The regeneration torque multiplier is determined based on the propulsion torque utilization amount and vehicle speed. Regeneration torque multiplier may be calculated or stored in a lookup table. A partial lookup table with some examples of regeneration torque multipliers are shown in FIG. 7. In some configurations, the regeneration torque multiplier is a number from 0 to 1 or can be expressed as a number from 0 to 1. In FIG. 7, the propulsion torque utilization amount expressed as a percentage is designated horizontally or along the horizontal axis while the vehicle speed is designated vertically or along the vertical axis. FIG. 7 is simplified to show regeneration torque multipliers at three different vehicle speeds (5, 15, and 25 mph) four different propulsion torque utilization amounts (25, 50, 75, and 100%). It is to be understood that regeneration torque multipliers may be calculated or provided at additional vehicle speeds, such as in increments of miles per hour or fractions of miles per hour, and at additional production torque utilization amounts, such as increments of percentages expressed as whole numbers or fractions of whole numbers. The examples of torque multipliers shown in FIG. 7 differ from each other; however, it is to be understood that regeneration torque multipliers may be duplicated. As an example, in some configurations a regeneration torque multiplier of 1 may be provided at a vehicle speed of 20 mph and a propulsion torque utilization amount of 100%. As another example, in some configurations a regeneration torque multiplier of 1 may be provided at a vehicle speed of 25 mph and a propulsion torque utilization amount of 95%.

The regeneration torque multiplier may increase as vehicle speed increases. For instance, at a particular vehicle speed, such as 5 mph, the regeneration torque multiplier is 0.18 (18%) at a propulsion torque utilization amount of 25%, 0.36 (36%) at a propulsion torque utilization amount of 50%, 0.7 (70%) at a propulsion torque utilization amount of 75%, and 0.9 (90%) at a propulsion torque utilization amount of 100%. Thus, the regeneration torque multiplier at a given or specified vehicle speed may be greater for the second vehicle type than the first vehicle type and may be greater for the third vehicle type and the second vehicle type.

At block 216, regenerative brake torque is provided based on the regeneration torque multiplier. Regenerative brake torque is provided by the electrical machine 24, such as when the torque command signal is indicative of a request for deceleration, such as by actuating a brake pedal or lifting off an accelerator pedal. The regeneration torque multiplier adjusts the regeneration torque that is provided by the electrical machine 24 in proportion to the regeneration torque multiplier. For instance, the amount of regenerative brake torque provided with the electrical machine 24 to a vehicle wheel decreases as the regeneration torque multiplier decreases. Expanding on the example in the previous paragraph at a vehicle speed of 5 mph, a regeneration torque multiplier of 0.18 may result the electrical machine being operated to provide 18% of the regeneration torque when the propulsion torque utilization amount is 25% (the vehicle is the first vehicle type, e.g., a tractor alone), 0.36 (36%) of the regeneration torque when the propulsion torque utilization amount is 50% (the vehicle is the second vehicle type, e.g., a tractor with an unloaded trailer), 0.70 (70%) of the regeneration torque when the propulsion torque utilization amount is 75% (the vehicle is the third vehicle type, e.g., a partially loaded tractor), and so on. As such, the regenerative brake torque provided with the electrical machine 24 may increase as vehicle weight increases. Conversely, the regenerative brake torque provided with the electrical machine 24 may decrease as vehicle weight decreases. As vehicle speed decreases, the regeneration torque provided with the electrical machine 24 may decrease since the regeneration torque multiplier decreases. Thus, regeneration torque provided with the electrical machine 24 to the vehicle wheel may decrease as vehicle speed decreases.

The regeneration torque multiplier may increase as the propulsion torque utilization amount increases. For instance, in the example shown in FIG. 7, at a propulsion torque utilization amount of 50%, torque multiplier is 0.36 (36%) at a vehicle speed of 5 mph, 0.42 (42%) at a vehicle speed of 15 mph, and 0.46 (46%) at a vehicle speed of 25 mph. Thus, the regeneration torque multiplier at a given or specified propulsion torque utilization amount may increase as vehicle speed increases.

The present invention may allow regenerative brake torque to be scaled or adjusted to accommodate changes in the weight of a vehicle, thereby improving drivability of the vehicle. Moreover, regenerative brake torque may be scaled or adjusted when the actual weight of the vehicle is not known, which may avoid the need for vehicle weight sensors and the associated expense and control system modifications to accommodate a vehicle weight sensor. Moreover, the method may be executed repeatedly to indirectly detect vehicle weight changes and allow a regenerative brake torque multiplier to be adjusted to reflect the current vehicle weight and vehicle operating conditions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system of a vehicle, the method comprising:

providing propulsion torque with an electrical machine of the drive axle system to a vehicle wheel based on a torque command signal;

determining a propulsion torque utilization amount based on the torque command signal, wherein the propulsion torque utilization amount is determined as a percentage of a maximum available continuous torque providable by the electrical machine when the propulsion torque is requested and is a proportion of a maximum available continuous torque of the electrical machine corresponding to the torque command signal;

determining a regeneration torque multiplier based on the propulsion torque utilization amount and a signal indicative of a vehicle speed; and then providing, when the torque command signal is indicative of a request for deceleration of the vehicle, regenerative brake torque with the electrical machine to the vehicle wheel based on the regeneration torque multiplier.

2. The method of claim 1 wherein the torque command signal is based on a position of an accelerator pedal of the drive axle system.

3. The method of claim 1 wherein providing regenerative brake torque with the electrical machine to the vehicle wheel is based on the regeneration torque multiplier and the torque command signal.

4. The method of claim 1 further comprising determining a vehicle type based on the propulsion torque utilization amount, wherein the vehicle type is one of a bobtail, a bobtail and an unloaded trailer coupled to the bobtail, or a bobtail and a loaded trailer that is coupled to the bobtail.

5. The method of claim 4 wherein determining the vehicle type further comprises comparing the propulsion torque utilization amount to a first threshold amount.

6. The method of claim 5 wherein determining the vehicle type further comprises identifying the vehicle type as a first vehicle type that is the bobtail when the propulsion torque utilization amount is not greater than the first threshold amount.

7. The method of claim 6 further comprising comparing the propulsion torque utilization amount to a second threshold amount when the propulsion torque utilization amount is greater than the first threshold amount.

8. The method of claim 7 wherein the first threshold amount is less than the second threshold amount.

9. The method of claim 7 wherein determining the vehicle type further comprises identifying the vehicle type as a second vehicle type that is the bobtail and the unloaded trailer coupled to the bobtail when the propulsion torque utilization amount is greater than the first threshold amount and is not greater than the second threshold amount.

10. The method of claim 9 further comprising storing regeneration torque multipliers for each of the vehicle types in a lookup table, wherein, in the lookup table, a regeneration torque multiplier of the first vehicle type is less than a regeneration torque multiplier of the second vehicle type at each vehicle speed of the lookup table.

11. The method of claim 9 wherein determining the vehicle type further comprises identifying the vehicle type as a third vehicle type that is the bobtail and the loaded trailer when the propulsion torque utilization amount exceeds the second threshold amount.

12. The method of claim 11 further comprising storing regeneration torque multipliers for each of the vehicle types in a lookup table, wherein, in the lookup table, a regeneration torque multiplier of the third vehicle type is greater than a regeneration torque multiplier of the second vehicle type at each vehicle speed of the lookup table.

13. The method of claim 5 further comprising comparing the propulsion torque utilization amount to a second threshold amount when the propulsion torque utilization amount is greater than the first threshold amount.

14. The method of claim 4 further comprising communicating the vehicle type to a driver of the vehicle via a communication device.

15. The method of claim 1 further comprising storing regeneration torque multipliers in a lookup table, wherein, in the lookup table, the regeneration torque multipliers increase as vehicle speed increases.

16. The method of claim 1 further comprising storing regeneration torque multipliers in a lookup table, wherein, in the lookup table, the regeneration torque multipliers increase as the propulsion torque utilization amount increases.

17. The method of claim 1 further comprising storing regeneration torque multipliers in a lookup table, wherein, in the lookup table, the regeneration torque multipliers increase as vehicle speed increases and as the propulsion torque utilization amount increases.

* * * * *